US010435039B2

United States Patent
Krismanic et al.

(10) Patent No.: US 10,435,039 B2
(45) Date of Patent: Oct. 8, 2019

(54) SANDING SYSTEM COMPRISING A PROTECTED MOTOR

(71) Applicant: KNORR-BREMSE GESELLSCHAFT MIT BESCHRÄNKTER HAFTUNG, Mödling (AT)

(72) Inventors: Georg Krismanic, Vienna (AT); Andreas Lang, Vienna (AT); Albert Schneider, Vienna (AT)

(73) Assignee: KNORR-BREMSE GESELLSCHAFT MIT BESCHRANKTER HAFTUNG (DE)

( * ) Notice: Subject to any disclaimer, the term of this patent is extended or adjusted under 35 U.S.C. 154(b) by 138 days.

(21) Appl. No.: 15/547,367

(22) PCT Filed: Jan. 26, 2016

(86) PCT No.: PCT/AT2016/050015
§ 371 (c)(1),
(2) Date: Jul. 28, 2017

(87) PCT Pub. No.: WO2016/118996
PCT Pub. Date: Aug. 4, 2016

(65) Prior Publication Data
US 2018/0022362 A1    Jan. 25, 2018

(30) Foreign Application Priority Data

Jan. 28, 2015   (AT) .............................. A 50056/2015

(51) Int. Cl.
| | |
|---|---|
| *B61C 15/10* | (2006.01) |
| *B60B 39/00* | (2006.01) |
| *B65G 53/46* | (2006.01) |
| *B60B 39/06* | (2006.01) |

(Continued)

(52) U.S. Cl.
CPC ............ *B61C 15/102* (2013.01); *B60B 19/06* (2013.01); *B60B 39/00* (2013.01); *B60B 39/022* (2013.01);
(Continued)

(58) Field of Classification Search
CPC ..... B61C 15/102; B61C 15/107; B60B 39/00; B60B 39/022; B60B 39/023; B60B 39/04; B60B 39/06; B60B 39/10; B60B 19/06
See application file for complete search history.

(56) References Cited

U.S. PATENT DOCUMENTS 9,510,501 B2 * 12/2016 Gebbeken ............... G01F 11/24
2002/0149188 A1 * 10/2002 Major ................... B60B 39/024
280/757

(Continued)

FOREIGN PATENT DOCUMENTS

| AT | 505783 A1 | 4/2009 |
|---|---|---|
| AT | 515028 A1 | 5/2015 |

(Continued)

OTHER PUBLICATIONS

Search Report and Written Opinion for International Patent Application No. PCT/AT2016/0500215; dated Jun. 1, 2016.

(Continued)

*Primary Examiner* — Jason C Smith
(74) *Attorney, Agent, or Firm* — Barnes & Thornburg LLP (57) ABSTRACT

A sanding system for a rail vehicle includes a housing of a cellular wheel sluice having an inlet located at the top and an outlet located at the bottom, a pivotably mounted cellular wheel having a plurality of cells, and a motor that is coupled with the cellular wheel. The sanding system further includes a container connected to the inlet of the cellular wheel sluice for receiving brake sand, or a feed line connected to the inlet (Continued)

of the cellular wheel sluice for transporting brake sand, and a discharge line connected to the outlet of the cellular wheel sluice for transporting brake sand. The motor for driving the cellular wheel is thereby arranged above the inlet.

17 Claims, 9 Drawing Sheets

(51) Int. Cl.
*B60B 19/06* (2006.01)
*B60B 39/02* (2006.01)
*B60B 39/04* (2006.01)
*B60B 39/10* (2006.01)
*B65G 53/66* (2006.01)

(52) U.S. Cl.
CPC ............ *B60B 39/023* (2013.01); *B60B 39/04* (2013.01); *B60B 39/06* (2013.01); *B60B 39/10* (2013.01); *B61C 15/107* (2013.01); *B65G 53/4616* (2013.01); *B65G 53/4633* (2013.01); *B65G 53/66* (2013.01)

(56) References Cited

U.S. PATENT DOCUMENTS

| | | | | |
|---|---|---|---|---|
| 2016/0244074 | A1* | 8/2016 | Krismanic | B61C 15/10 |
| 2016/0264153 | A1* | 9/2016 | Bartling | B60B 39/04 |
| 2017/0144676 | A1* | 5/2017 | Arditi | B61C 15/10 |
| 2018/0022362 | A1* | 1/2018 | Krismanic | B61C 15/102 291/25 |
| 2018/0072098 | A1* | 3/2018 | Pessoa | B60B 39/025 |
| 2018/0072329 | A1* | 3/2018 | Krismanic | B61C 15/10 |
| 2018/0119376 | A1* | 5/2018 | Klima | E01H 8/105 |

FOREIGN PATENT DOCUMENTS

| | | |
|---|---|---|
| CN | 201231749 Y | 5/2009 |
| CN | 102381321 A | 3/2012 |
| CN | 102774387 A | 11/2012 |
| DE | 572411 C | 3/1933 |
| DE | 3009332 A1 | 10/1980 |
| DE | 10 2005 052741 A1 | 5/2007 |
| DE | 10 2012 024266 A1 | 6/2014 |
| DE | 10 2013 110 991 B3 | 11/2014 |
| WO | 9620094 A1 | 7/1996 |
| WO | 2008064747 A1 | 6/2008 |
| WO | 2015055699 A1 | 4/2014 |

OTHER PUBLICATIONS

Austrian Office Action corresponding to A 50056/2015-1,2, dated Feb. 9, 2016.

Chinese Office Action corresponding to 201680007641.7, dated Jun. 27, 2018.

* cited by examiner

SANDING SYSTEM COMPRISING A PROTECTED MOTOR

CROSS REFERENCE AND PRIORITY CLAIM

This patent application is a U.S. National Phase of International Patent Application No. PCT/AT2016/050015, filed Jan. 26, 2016, which claims priority to Austrian Patent Application No. A 50056/2015, filed 23 Jan. 28, 2015, the disclosures of which are incorporated herein by reference in their entirety.

FIELD

Disclosed embodiments relate to a sanding system or a distributing device for a rail vehicle.

BACKGROUND

Such sanding systems/distributing devices are essentially known. For example, in this regard, AT 505 783 A1 discloses a distributing device having a sand feed coming from a sand container, which sand feed leads into a rotating star wheel which is provided with chambers, arranged in a star shape, to be filled with the flow of sand.

SUMMARY

Disclosed embodiments relate to a sanding system or a distributing device for a rail vehicle.

In accordance with disclosed embodiments a sanding system or a distributing device comprises a housing of a star wheel feeder, a star wheel which is rotatably mounted in the housing and has a plurality of cells, an inlet arranged above the star wheel in the housing and an outlet arranged below the star wheel, a motor coupled to the star wheel, a container for receiving braking sand, which is connected to the inlet of the star wheel feeder, or a supply line for transporting braking sand, which is connected to the inlet of the star wheel feeder, and a discharge line for transporting braking sand, which is connected to the outlet of the star wheel feeder.

Disclosed embodiments provide an improved sanding system/distributing device. In particular, the aim is to better protect the drive motor of the star wheel from the environmental influences which occur during operation of a rail vehicle.

Disclosed embodiments achieve the disclosed functionality by a sanding system/distributing device of the type mentioned at the outset, in which the motor is arranged above the inlet of the star wheel feeder.

Functionality of the disclosed embodiments is also achieved by a rail vehicle which comprises a sanding system of the type mentioned.

BRIEF DESCRIPTION OF THE FIGURES

For better understanding the disclosed embodiments, explanation is provided in more detail with reference to the following figures.

The figures each show in a highly schematized illustration.

It should be established that, in the differently described embodiments, the same parts are provided with the same reference signs or the same component identifiers, wherein the disclosures contained in the description as a whole can be applied analogously to the same parts having the same reference signs or the same component identifiers. Also, the position specifications chosen in the description, e.g. top, bottom, laterally etc. also relate to the directly described and illustrated figure and, with a change in position, should be applied analogously to the new position.

DETAILED DESCRIPTION

Known constructions are disadvantageous in that the drive motor, owing to the installation position, is relatively highly exposed to environmental influences (moisture, temperature, dirt, etc.) which occur during operation of a rail vehicle.

To the contrary, in accordance with the disclosed embodiments, the motor is thus moved further away from the rails and further into the interior of the rail vehicle. The motor is therefore relatively well projected from the environmental influences which occur during operation of the rail vehicle. Moreover, a relatively slim construction of the sanding system is produced, thereby facilitating the installation in the rail vehicle.

The position specifications "top", "bottom", "above", "below" etc. relate to the position of the sanding system during operation. In general terms, the motor is therefore arranged on the side of the inlet and opposite the outlet.

Optionally, the axis of rotation of the star wheel may be aligned vertically, which enables the drive motor for the star wheel to be arranged particularly effectively above the inlet of the star wheel feeder, for example by providing a correspondingly long shaft leading from the star wheel to the motor.

Optionally, the axis of rotation of the star wheel and the motor shaft may be aligned parallel to one another or arranged coaxially or at an angle to one another. This gives the option of coupling the motor and the star wheel directly, or via a spur gear, a belt drive, a bevel gear or a chain.

In general, the use of a gear for coupling the motor to the star wheel is advantageous for reducing the speed of the motor to the desired speed at the star wheel. In addition to the options already mentioned above, it is for example also possible to use a planetary gear, a bevel gear, a crown wheel gear or a torus gear (available from the company Tedec AG, http://torus-gear.com).

Optionally, the motor is coupled to the star wheel via a shaft which is guided out of the sand container or out of the sand supply line. The motor is therefore easily accessible.

Optionally, a coupling is provided in the course of the shaft. This enables the shaft portions to be separated for inspection purposes. However, the coupling is not releasable during operation.

Optionally, the inlet of the star wheel feeder is connected to a container for receiving braking sand and the motor is arranged above the container. The motor is thus well protected, but also easily accessible.

Optionally, the inlet of the star wheel feeder is connected to a container for receiving braking sand and the motor is arranged in the container. The motor is thus well protected from environmental influences.

Optionally, the container is annular in form, at least in portions, with an inner wall and an outer wall and the motor is arranged within the inner wall. The motor is thus both particularly well protected from external environmental influences and also from contact with the braking sand. The sand box can be in particular circular cylindrical, but also polygonal or oval, for example.

Optionally, the cavity enclosed by the inner wall is covered by an upwardly curved cover, in particular in the form of a cone or hemisphere. The sand is thus easily able to flow around the region in the sand box which is provided for the motor.

Optionally, the cavity enclosed by the inner wall is covered by an agitator/activator driven by the motor. This further improves the above-mentioned flowability of the braking sand.

Optionally, the sanding system has an air supply line, which leads into the cavity enclosed by the inner wall, and an air discharge line, which leads out of the cavity. It is thus possible to cool the motor, for example by connecting a fan to the air supply line or air discharge line. It is, in particular, also conceivable to align the air supply line in the direction of travel of the rail vehicle and/or to align the air discharge line transversely to the direction of travel, to make use of the increasing dynamic pressure/decreasing static pressure as the vehicle speed increases.

Optionally, the sanding system has an air supply line, which leads into the cavity enclosed by the inner wall, and air discharge openings in the inner wall. It is thus possible to use cooling air heated by the motor for drying the braking sand. It is in turn possible to connect a fan to the air supply line or to align this latter in the direction of travel of the rail vehicle. It is also possible to make use of the suction produced as the braking sand is transported away for taking in cooling air.

Figure 1:
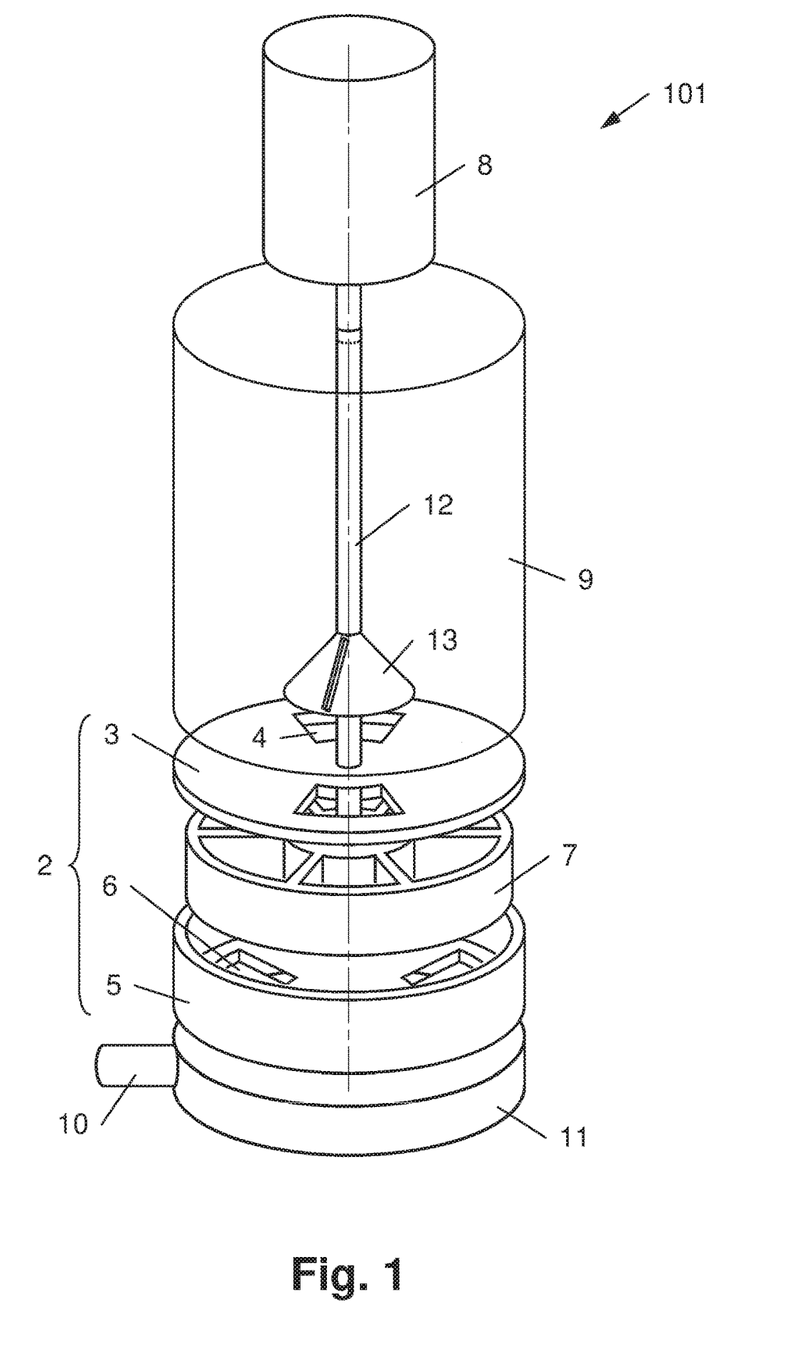
FIG. 1 a first schematically illustrated example of a sanding system having a motor arranged above the sand container, in an exploded illustration.

With this understanding in mind, FIG. 1 shows a first example of a sanding system 101 for a rail vehicle in an exploded illustration. The sanding system 101 comprises a star wheel feeder 2 having a housing which has a housing upper part 3 and a housing lower part 5 and a star wheel 7 which is rotatably mounted in the housing 3, 5 and has a plurality of cells. The housing upper part 3 has inlets 4 arranged above the star wheel 7 and the housing lower part 5 has outlets 6 arranged below the star wheel 7. The sanding system 101 furthermore comprises a motor 8 coupled to the star wheel 7, a container 9 for receiving braking sand, which is connected to the inlets 4 of the star wheel feeder 2, and a discharge line 10 for transporting braking sand (away), which is connected to the outlets 6 of the star wheel feeder 2. The discharge line 10 in this example is attached to the star wheel feeder 2 via a collector 11.

The motor 8 is arranged above the inlets 4 and, in the example illustrated specifically in FIG. 1, is coupled to the star wheel 7 via a shaft 12 which is guided out of the container 9. In this example, the motor 8 is therefore arranged not only above the inlets 4 but also above the container 9. The sanding system 101 additionally comprises an optional agitator 13, which is coupled to the shaft 12 and is arranged in the container 9.

The container 9 is illustrated transparently in FIG. 1 for clearer representation. Where appropriate, the shaft 12 is moreover illustrated longer than it is in reality to also enable a clear representation of the coupling between the star wheel 7 and the motor 8 in the exploded drawing.

The function of the sanding system 101 illustrated in FIG. 1 is now as follows:

Braking sand poured into the container 9 penetrates into the chambers of the star wheel 7 via the two inlets 4, but arrives no further from there when the star wheel 7 is stationary. If the star wheel 7 is set in rotation with the aid of the motor 8, the star wheel blades push the sand located in the star wheel chambers to the outlets 6, where it falls through into the collector 11 and is transported away from there via the discharge pipe 10, for example with the aid of compressed air. The sand is prevented from clumping by the agitator 13 driven by the shaft 12. The agitator can have ribs for this purpose, as illustrated, but it can also be equipped with agitator blades which project somewhat further. The braking sand which is transported away is then conducted to the wheels of a rail vehicle and improves the traction of this latter during starting and braking (see also FIG. 12).

Figure 10:
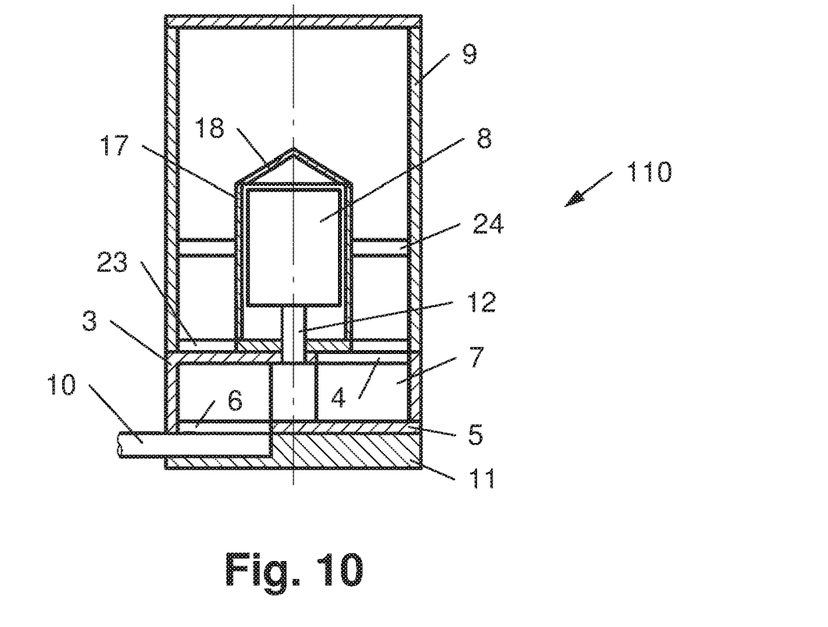
FIG. 10 similar to FIG. 7, but with an activator which is driven by the motor and located above the star wheel feeder.

In the example illustrated in FIG. 1, the housing 3, 5 has two inlets 4 and two outlets 6. The star wheel 7 furthermore has six chambers. It goes without saying that this should only be seen as an illustrative example. The number of inlets 4 and outlets 6 and chambers can, of course, also deviate from the illustration. Instead of the agitator 13, or in addition thereto, it is also possible to provide an activator which can be formed in particular by an impeller arranged directly above the housing upper part 3, which conveys free-flowing material into the chambers of the star wheel 6 and ensures that these are filled effectively (c.f. FIG. 10). In particular, such an activator can also be combined with a (smooth) cone. An agitator 13 can have, in particular, blade-like projections or arms which agitate the free-flowing material and thereby loosen it.

Figure 2:
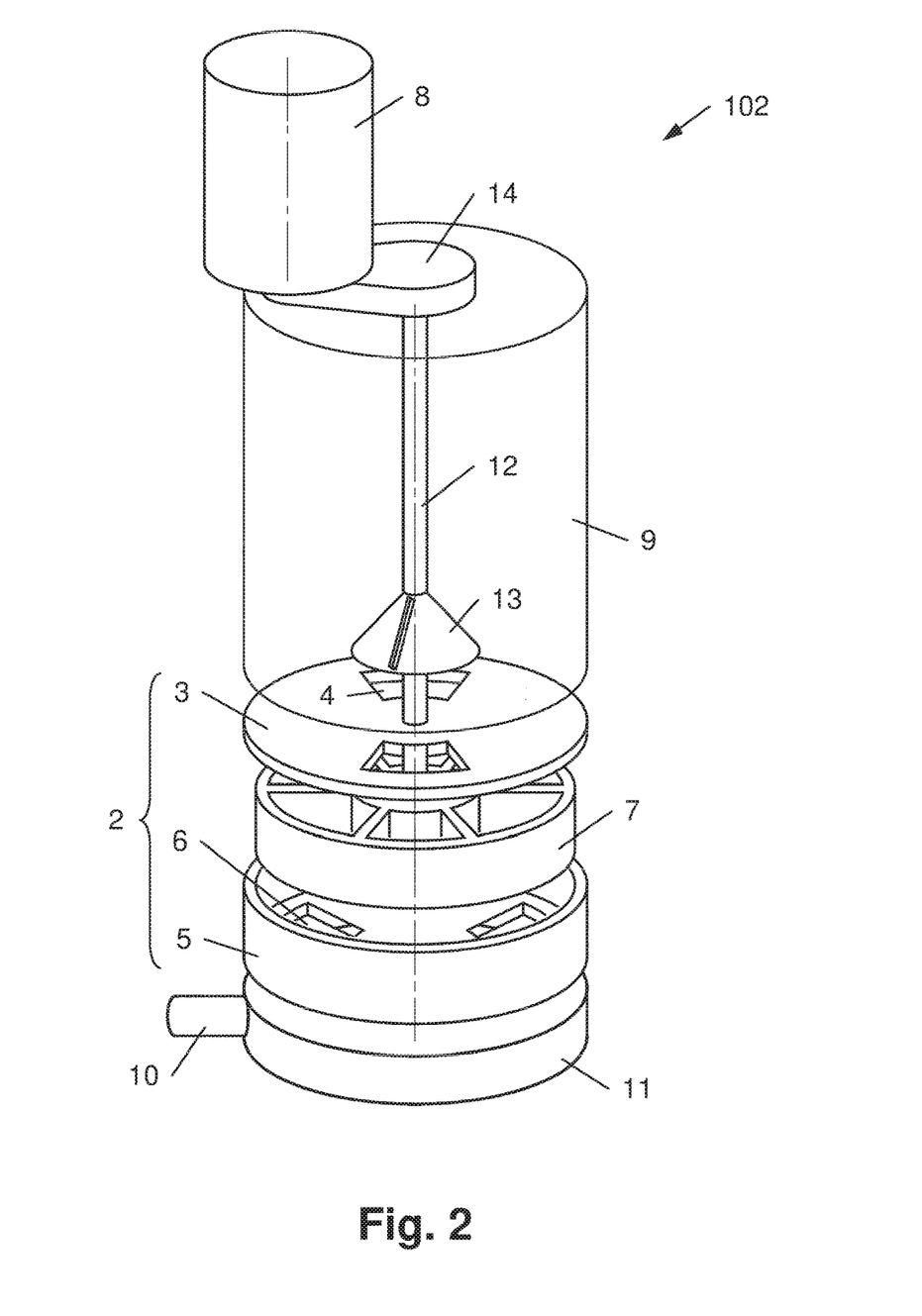
FIG. 2 as FIG. 1, but with a gear arranged above the sand container.

In FIG. 1, the axis of rotation of the star wheel 7 and the motor shaft are arranged coaxially. However, it would also be conceivable for the two axes to be aligned parallel to one another. FIG. 2 shows an example of this, in which the motor 8 drives the shaft 12 via a gear 14 which is arranged above the container 9. The gear 14 can be formed for example as a belt drive, a chain drive or as a spur gear. Possible belts are, for example, flat belts, round belts, V-belts or ribbed V-belts.

It goes without saying that a parallel or coaxial alignment of the axis of rotation of the star wheel 7 and the motor shaft is not compulsory and that these can instead also be arranged at an angle to one another. For example, the motor 8 and the shaft 12 can be coupled to one another via a bevel gear, a crown wheel gear, a worm gear or via a torus gear (available from the company Tedec AG, http://torus-gear.com). It is moreover also possible to align the shaft 12 and the motor shaft at an angle to one another and to couple them to one another for example via a bevel gear.

Figure 3:
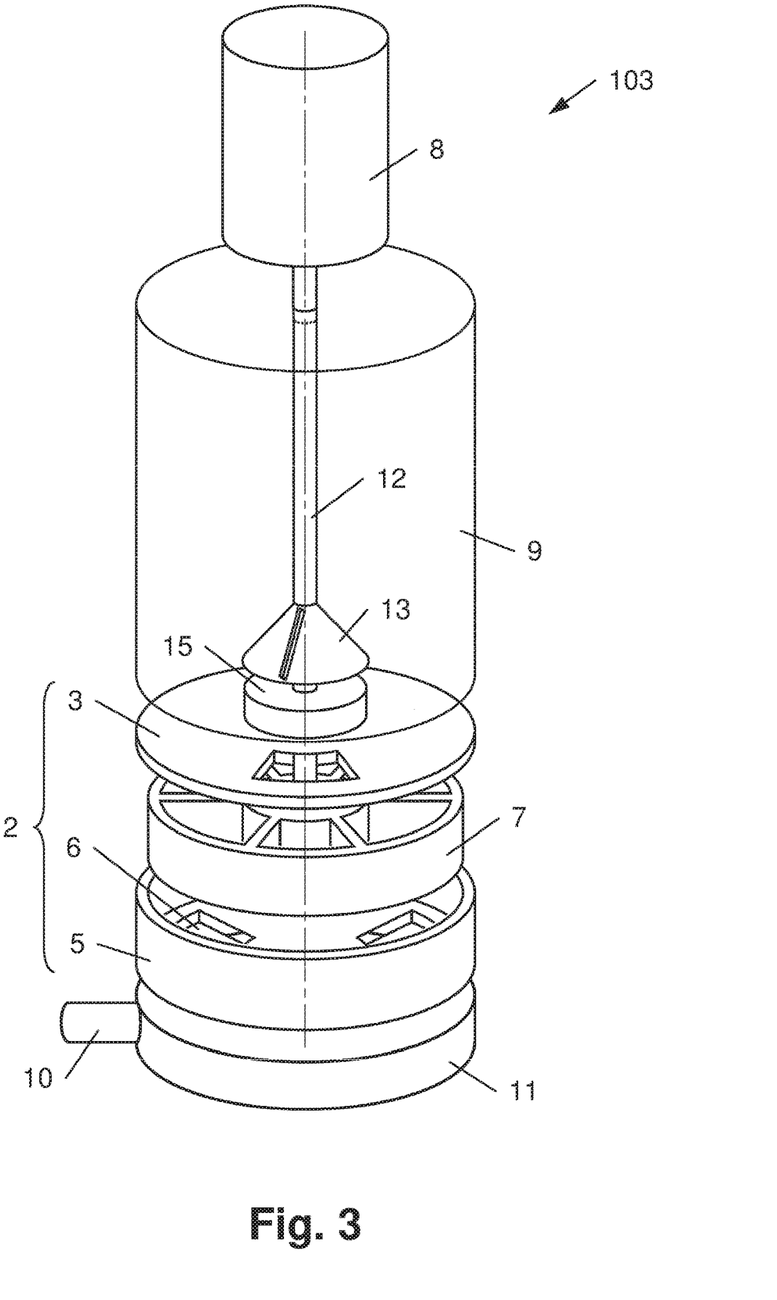
FIG. 3 as FIG. 1, but with a planetary gear arranged in the sand container.

FIG. 3 now shows a further example in which a planetary gear 15 is provided in the course of the shaft 12. This enables a coaxial arrangement of the star wheel 7 and the motor 8. In the example shown, the planetary gear 15 is arranged in the vicinity of the star wheel feeder 2 or mounted directly thereon. The shaft 12 can thus be of a relatively thin design. This moreover gives the advantage that the agitator 13 can be operated at a different speed from the star wheel 7. However, it goes without saying that the planetary gear 15, like the gear 14, can also be arranged above the sand container 9. In an equivalent manner, it is conceivable that the gear 15 is arranged closer to the star wheel 7 and partially in the sand container 9.

Figure 4:
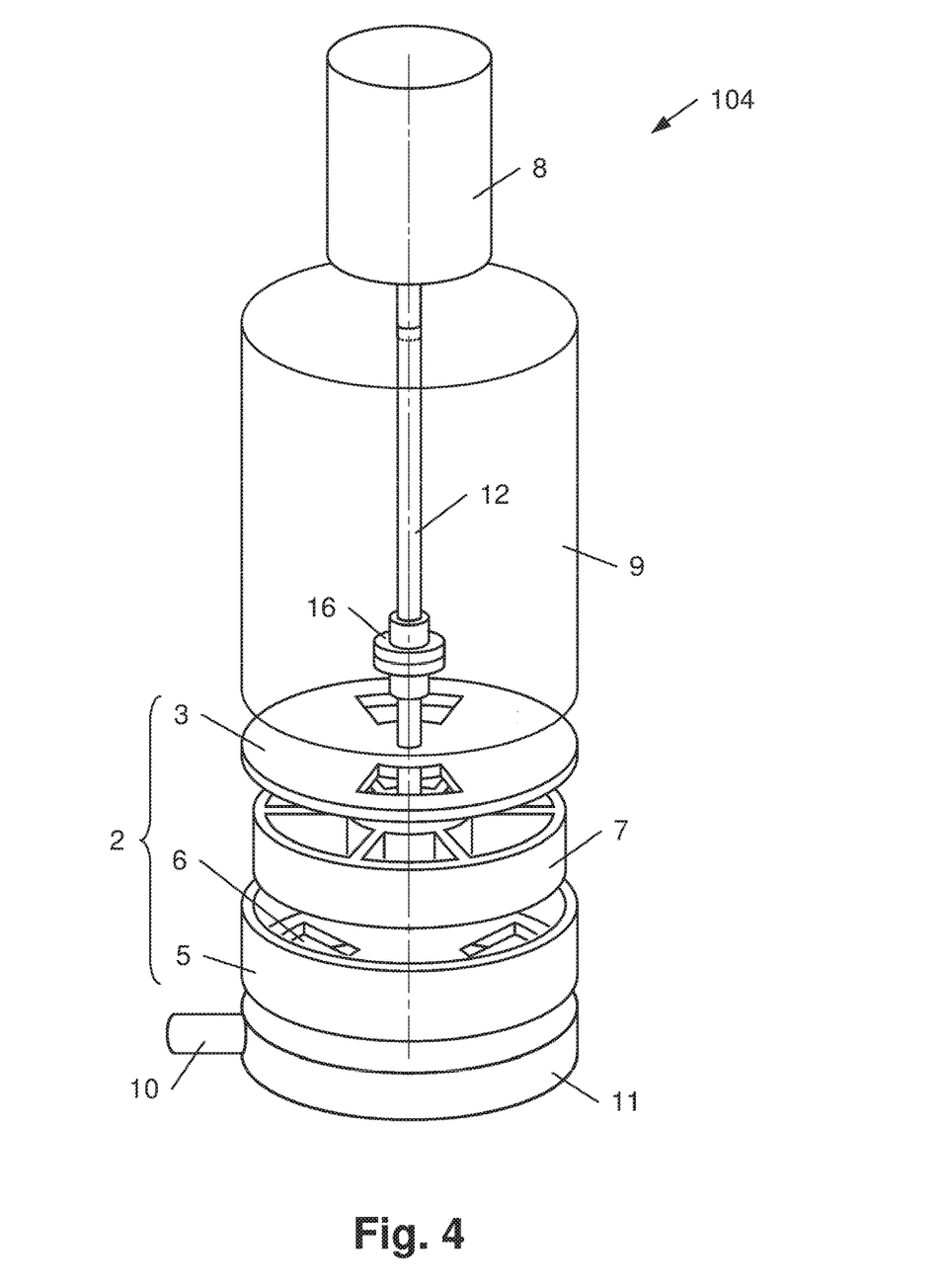
FIG. 4 as FIG. 1, but with a coupling in the course of the drive shaft.

FIG. 4 shows an example having a coupling 16 arranged in the course of the shaft 12. The coupling 16 in this example is not releasable during operation, but serves to separate the shaft portions for inspection purposes. In the example shown in FIG. 4, an agitator 13 is not provided. It goes without saying that the coupling 16 can also be used in combination with an agitator 13/activator or a gear 14, 15. The coupling 16 can also be arranged at a different point and more than one coupling 16 can be provided.

Figure 5:
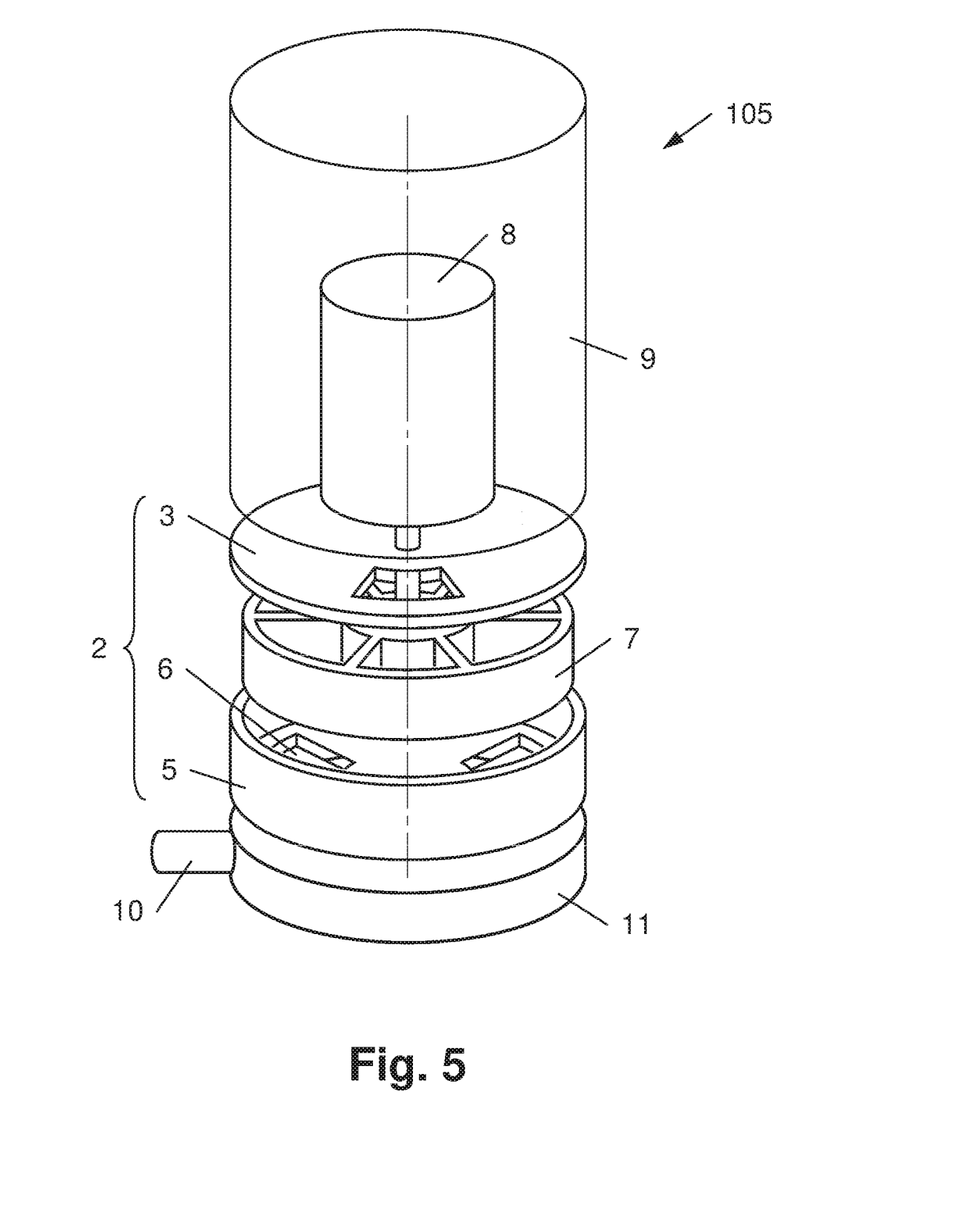
FIG. 5 an example of a sanding system having a motor arranged in the sand container.

FIG. 5 now shows a further variant of a sanding system 105, in which the motor 8 for the star wheel 7 is arranged in the sand container 9. The motor 8 is therefore particularly well protected from environmental influences.

Figure 6:
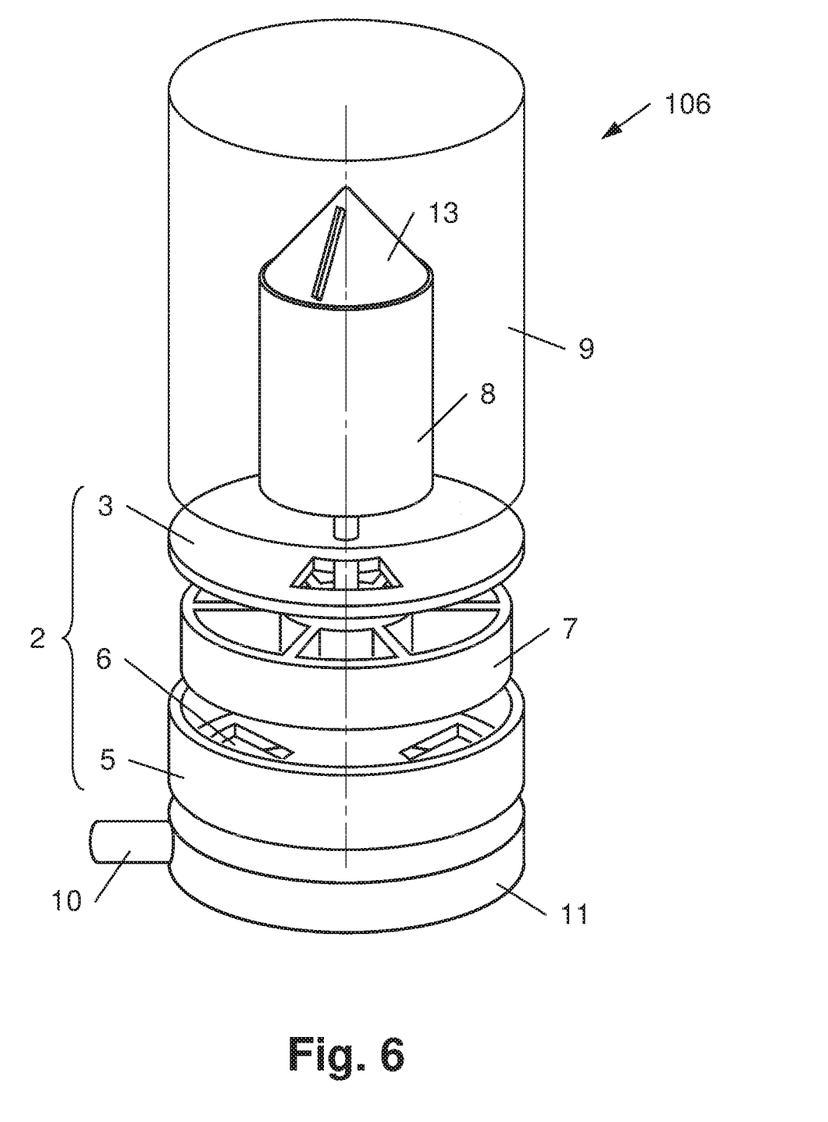
FIG. 6 as FIG. 5, but with an agitator arranged above the motor.

The sanding system 106 of FIG. 6 is constructed similarly to the sanding system 105 illustrated in FIG. 5. However, in FIG. 6, an agitator 13, which is driven by the motor 8, is provided above the motor 8. It is alternatively also conceivable that the upper region of the (fixed) motor housing is formed in an arched shape, in particular in the form of a hemisphere or cone, and the sand is thus able to flow around the motor 8.

It is also conceivable that the agitator 13 is mounted eccentrically or that a smooth cone (vibrator) is provided instead of the agitator 13. As a result of the vibrations produced, the free-flowing material is (additionally) loosened. The vibrator advantageously rotates more quickly than the star wheel 7, optionally synchronously with the motor 8. It is, of course, also conceivable that a gear is connected between the motor 8 and the vibrator. It is also advantageous if the vibrator only operates simultaneously with the star wheel 7 to avoid undesired compacting of the free-flowing material. In FIG. 6, this is effected in that the vibrator is seated directly on the shaft of the motor 9.

Figure 7:
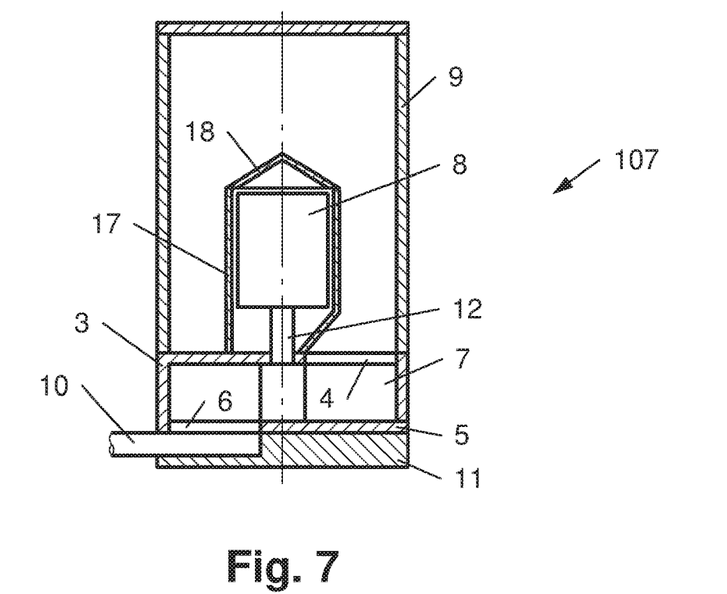
FIG. 7 a schematic sectional illustration of a sanding system having a motor which is arranged in an annular sand container.

In a further advantageous variant embodiment, the container 9 is annular in form, at least in portions, with an inner wall and an outer wall, and the motor 8 is arranged within the inner wall. FIG. 7 shows a first example of this in a sectional illustration, which is similar to the sanding system 106 illustrated in FIG. 6. In contrast, however, the motor 8 does not need to be specifically sealed since it is located within the inner wall 17. A further difference from the example of FIG. 6 is that the sanding system 107 of FIG. 7 does not have an upper agitator 13, but is instead covered (rigidly) in the form of a cone. It goes without saying that, instead of the conical cover 18, a flat cover, a hemispherical cover or an upwardly curved cover in a different form could also be provided. It is, of course, also possible to use the agitator 13 or an activator.

Figure 8:
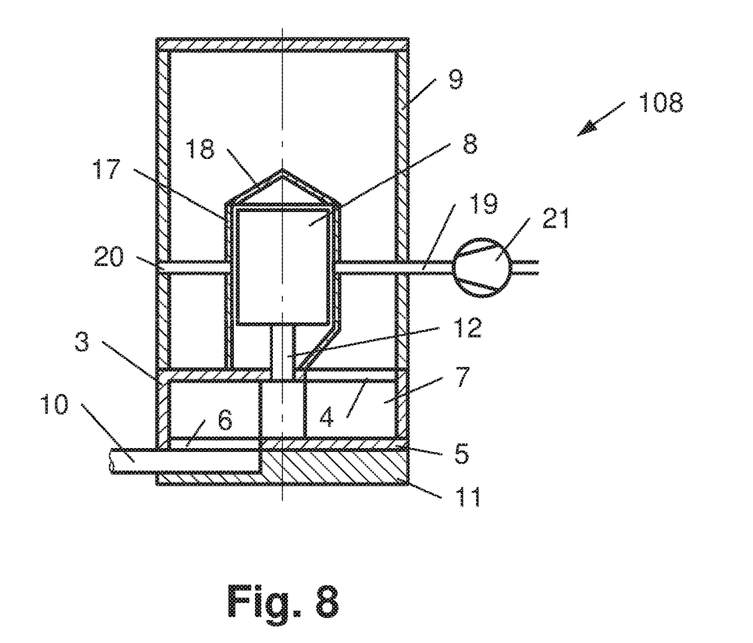
FIG. 8 as FIG. 7, but with cooling air lines.
Figure 9:
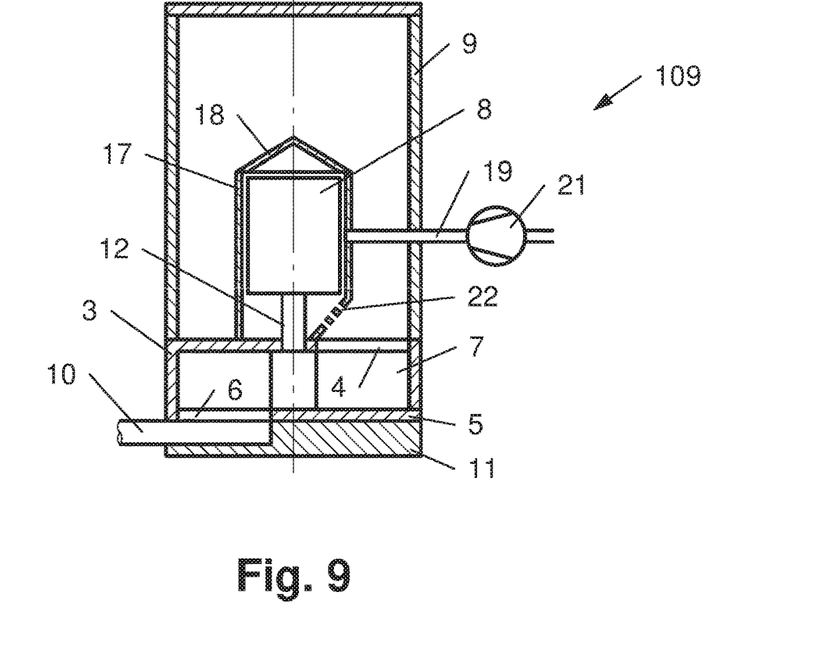
FIG. 9 similar to FIG. 7, but with air exit openings, which lead into the sand container.

FIG. 8 shows a further example of a sanding system 108, which is very similar to the sanding system 107 illustrated in FIG. 7. In contrast, however, this also comprises an air supply line 19, which leads into the cavity enclosed by the inner wall 17, and an air discharge line 20 which leads out of the cavity. The motor 8 can be cooled with the aid of a fan 21. It is alternatively also conceivable that the inner wall 17, as illustrated in FIG. 9, has air discharge openings 22, which lead into the region filled with braking sand. The cooling air thus fulfills a double function since it serves not only to cool the motor 8, but is also used, heated, for drying the braking sand.

FIG. 10 shows a further variant of a sanding system 110, in which an activator 23 or agitator arranged below the motor 8 is driven via the shaft 12. The activator 23 can be formed as a (for example three-blade) impeller and conveys the free-flowing material into the chambers of the star wheel 6, ensuring good filling thereof.

A support 24 is furthermore provided in FIG. 10, which comprises a plurality of arms, for example, which connect the inner wall 17 to the container 9. This support 24 is expedient since the activator 23 is rotatably mounted. It goes without saying that such a support 24 can also be provided for the embodiments according to FIGS. 5 to 9 or can also support the shaft 12 in FIGS. 1 to 4.

Figure 11:
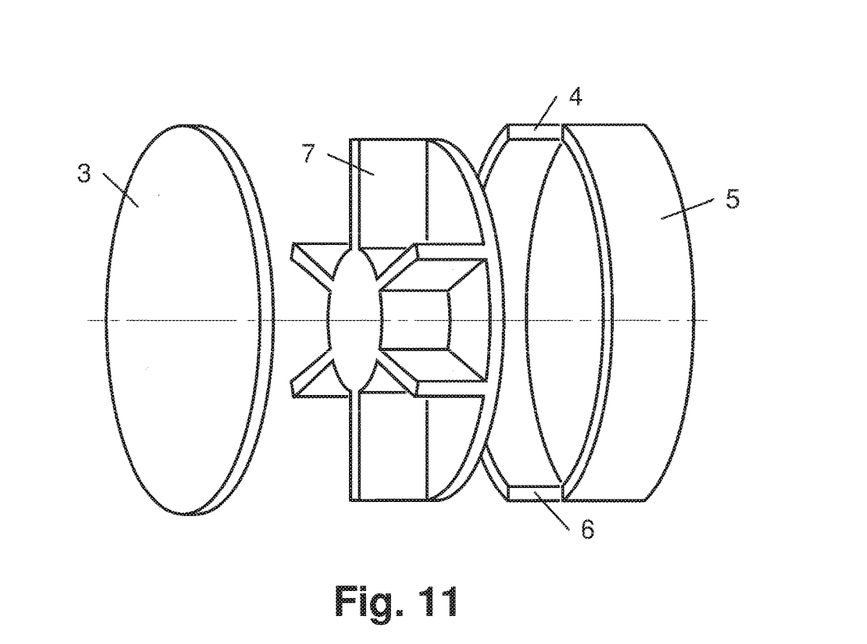
FIG. 11 a schematically illustrated star wheel feeder having a horizontally aligned axis of rotation of the star wheel.

In the examples according to FIGS. 1 to 10, the axis of rotation of the star wheel 7 is aligned vertically. However, it would, in principle, also be conceivable for its axis of rotation to be aligned horizontally as is illustrated purely schematically in FIG. 11. The variant embodiments hitherto mentioned can also be applied analogously to a horizontally aligned axis of rotation. For example, the axis of rotation of the star wheel 7 and the motor shaft can be aligned parallel to one another and be coupled to one another for instance via a spur gear, a belt drive or a chain. However, the axis of rotation of the star wheel 7 and the motor shaft can also be arranged at an angle to one another. For example, the motor 8 and the star wheel 7 can be coupled to one another via a bevel gear, a crown wheel gear, a worm gear or via a torus gear (available from the company Tedec AG, http://torus-gear.com). This gear also enables the motor 8 to be arranged above the level of the inlets 4 when the axis of rotation of the star wheel 7 is aligned horizontally.

In particular, with a vertical axis of rotation, the inlets 4 are arranged axially above the star wheel 7 and the outlets 6 are arranged axially below the star wheel 7. With a horizontal axis of rotation, the inlets 4 are arranged, in particular, radially above the star wheel 7 and the outlets 6 are arranged radially below the star wheel 7.

In the previous examples, it was taken as a starting point that the star wheel feeder 2 is coupled directly to a sand container 9. However, it would also be conceivable that the sand container 9 is arranged offset from the star wheel feeder 2 and is connected thereto by a line. Analogously, a shaft 12 which is coupled to the star wheel 7 can not only be guided out of the sand container 9 but also out of the supply line (c.f. also FIGS. 1 to 4).

It is furthermore pointed out that the sand container 9, despite always being illustrated in the form of a circular cylinder or circular annulus in the figures, can, of course, also have another form. For example it can also have a polygonal, in particular quadrangular, or oval area.

Figure 12:
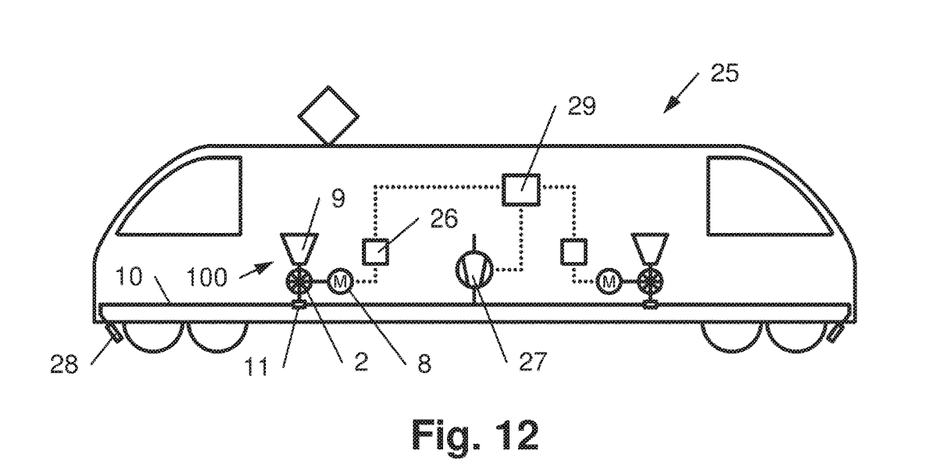
FIG. 12 a schematic illustration of a rail vehicle having an installed sanding system.

Finally, FIG. 12 shows an example of a sanding system 100 installed in a rail vehicle 25. The sanding system 100 in turn comprises a star wheel feeder 2, a sand container 9, a collector 11, a motor 8 and, in addition, a control 26. The collector 11 is attached to a compressor 27 and is also connected to a downpipe 28 via the discharge line 10. In the concrete example, the rail vehicle 25 comprises two sanding systems 100, which are connected to a central control 29.

During braking, the central control 29 incites the motor control 26 of the star wheel feeder 2 to activate the motor 8 and thereby rotate the star wheel 7. At the same time, the compressor 27 is also activated, or, if the compressor 27 is already in operation, a solenoid valve in the compressed air line is simply activated. The braking sand is thereby transported in metered quantities from the container 9 to the downpipe 28 and, from there, falls in front of the wheels of the rail vehicle 25 to increase the traction during braking and during starting.

At this point, it is pointed out that the star wheel 7 in FIG. 12 has been illustrated with a horizontally aligned axis of rotation to improve the explanatory power of the schematic illustration. It goes without saying that FIG. 12 also relates in an unrestricted manner to star wheels 7 with a vertically aligned axis of rotation and therefore in particular to the embodiments illustrated in FIGS. 1 to 10. The compressor 27 can furthermore replace the compressor/fan 21 of FIGS. 8 and 9 and be attached to the line 19.

The exemplary embodiments show possible variant embodiments of a sanding system 100 . . . 110 and of a rail vehicle 25, wherein it should be noted at this point that the disclosed embodiments are not restricted to the variant embodiments illustrated specifically and that, instead, diverse mutual combinations of the individual variant embodiments are also possible and, based on the technical teaching herein, these possible variations are known to the expert in this technical field. Therefore, all of the conceivable variant embodiments which are possible through combining individual details of the variant embodiments illustrated and described are also included in the scope of protection.

It is stated in particular that the devices illustrated can, in reality, also comprise more or fewer components than illustrated.

For the record, it should finally be pointed out that, for better understanding of the construction of the sanding system 100 . . . 110 and the rail vehicle 25, the illustrations thereof, or of the components thereof, are not always shown to scale and/or are sometimes shown on an enlarged scale and/or on a smaller scale.

The object on which the discrete inventive solutions are based can be taken from the description.

LIST OF REFERENCE SIGNS

100 . . . 110 Sanding system/distributing device
2 Star wheel feeder
3 Housing upper part
4 Inlet
5 Housing lower part
6 Outlet
7 Star wheel
8 Motor
9 Sand container/sand box
10 Discharge pipe/discharge line
11 Collector
12 Shaft
13 Agitator
14 Gear
15 Planetary gear
16 Coupling
17 Inner wall of the sand container
18 Conical cover
19 Air supply pipe
20 Air discharge pipe
21 Fan
22 Air discharge openings
23 Activator
24 Support
25 Rail vehicle
26 Control for the sanding system
27 Compactor
28 Downpipe
29 Central control

The invention claimed is:

1. A sanding system for a rail vehicle, the sanding system comprising:
a housing for a star wheel feeder;
a star wheel which is rotatably mounted in the housing and has a plurality of cells;
an inlet of the star wheel feeder arranged above the star wheel in the housing and an outlet arranged below the star wheel;
a motor coupled to the star wheel;
a container for receiving braking sand, the container being connected to the inlet of the star wheel feeder, or to a supply line for transporting braking sand connected to the inlet of the star wheel feeder; and
a discharge line for transporting braking sand, which is connected to an outlet of the star wheel feeder,
wherein the motor is arranged above the star wheel feeder inlet, wherein an axis of rotation of the star wheel is arranged vertically relative to the housing.

2. The sanding system of claim 1, wherein the axis of rotation of the star wheel and a shaft of the motor are aligned parallel to one another or are arranged coaxially or at an angle to one another.

3. The sanding system of claim 2, wherein the motor is coupled to the star wheel via a gear.

4. The sanding system of claim 2, wherein the motor is coupled to the star wheel via a shaft guided out of the container or out of the supply line.

5. The sanding system of claim 2, wherein the motor is coupled to the star wheel via a gear.

6. The sanding system of claim 1, wherein the motor is coupled to the star wheel via a shaft guided out of the container or out of the supply line.

7. The sanding system of claim 1, wherein the motor is coupled to the star wheel via a gear.

8. The sanding system of claim 1, wherein an axis of rotation of the star wheel and a shaft of the motor are aligned parallel to one another or are arranged coaxially or at an angle to one another.

9. The sanding system of claim 1, wherein the motor is coupled to the star wheel via a shaft guided out of the container or out of the supply line.

10. The sanding system of claimed claim 9, further comprising a coupling is provided in the course of the shaft coupling the star wheel and the motor.

11. The sanding system of claim 1, wherein the inlet of the star wheel feeder is connected to the container for receiving braking sand and the motor is arranged above the container.

12. The sanding system of claim 1, wherein the inlet of the star wheel feeder is connected to the container for receiving braking sand and the motor is arranged in the container.

13. The sanding system of claim 1, wherein the container is annular in form, at least in portions, with an inner wall and an outer wall, and the motor is arranged within the inner wall.

14. The sanding system of claim 13, wherein the cavity enclosed by the inner wall is covered by an upwardly curved cover.

15. A sanding system for a rail vehicle, the sanding system comprising:
a housing for a star wheel feeder;
a star wheel which is rotatably mounted in the housing and has a plurality of cells;

an inlet of the star wheel feeder arranged above the star wheel in the housing and an outlet arranged below the star wheel;

a motor coupled to the star wheel;

a container for receiving braking sand, the container being connected to the inlet of the star wheel feeder, or to a supply line for transporting braking sand connected to the inlet of the star wheel feeder; and a discharge line for transporting braking sand, which is connected to an outlet of the star wheel feeder, wherein the container is annular in form, at least in portions, with an inner wall and an outer wall, and the motor is arranged within the inner wall, wherein the cavity enclosed by the inner wall is covered by an activator driven by the motor.

16. The sanding system of claim 13, further comprising an air supply line, which leads into the cavity enclosed by the inner wall, and an air discharge line, which leads out of the said cavity.

17. A rail vehicle including a sanding system for a rail vehicle, the sanding system comprising:

a housing for a star wheel feeder;

a star wheel which is rotatably mounted in the housing and has a plurality of cells;

an inlet of the star wheel feeder formed in a wall of the housing arranged above the star wheel in the housing and an outlet formed in a wall of the housing arranged beneath belew the star wheel;

a motor coupled to the star wheel;

a container for receiving braking sand, the container being connected to the inlet of the star wheel feeder, or to a supply line for transporting braking sand connected to the inlet of the star wheel feeder; and a discharge line for transporting braking sand, which is connected to an outlet of the star wheel feeder, wherein the motor is arranged above the star wheel feeder inlet.

* * * * *